United States Patent
Kim et al.

(10) Patent No.: US 12,072,600 B2
(45) Date of Patent: Aug. 27, 2024

(54) MACH-ZEHNDER INTERFEROMETRIC OPTICAL MODULATOR WITH SHALLOW RIDGE WAVEGUIDE STRUCTURE AND METHOD FOR MANUFACTURING THE SAME

(71) Applicant: ELECTRONICS AND TELECOMMUNICATIONS RESEARCH INSTITUTE, Daejeon (KR)

(72) Inventors: Hyun Soo Kim, Daejeon (KR); Duk Jun Kim, Daejeon (KR); Dong-Young Kim, Daejeon (KR); Ho Sung Kim, Daejeon (KR); Yongsoon Baek, Daejeon (KR); Jang Uk Shin, Daejeon (KR); Young-Tak Han, Daejeon (KR); Won Seok Han, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 113 days.

(21) Appl. No.: 17/852,173

(22) Filed: Jun. 28, 2022

(65) Prior Publication Data
US 2023/0073881 A1 Mar. 9, 2023

(30) Foreign Application Priority Data
Sep. 8, 2021 (KR) .................. 10-2021-0119437

(51) Int. Cl.
*G02F 1/21* (2006.01)
*G02B 6/125* (2006.01)
*G02F 1/225* (2006.01)

(52) U.S. Cl.
CPC .............. *G02F 1/212* (2021.01); *G02F 1/225* (2013.01); *G02B 6/125* (2013.01)

(58) Field of Classification Search
None
See application file for complete search history.

(56) References Cited

U.S. PATENT DOCUMENTS 6,181,843 B1    1/2001  Lee
6,521,476 B2 *  2/2003  Kubota ................ H01S 5/2231
                                                        438/22

(Continued)

FOREIGN PATENT DOCUMENTS

JP        2010-27172 A      12/2010
JP        5189200 B2         4/2013

(Continued)

OTHER PUBLICATIONS

D. Hoffmann et al., "45 GHz Bandwidth Travelling Wave Electrode Machzehnder Modulator With Integrated Spot Size Converter", IPRM, 2004.

(Continued)

*Primary Examiner* — Rhonda S Peace (57) ABSTRACT

Disclosed are a Mach-Zehnder interferometric optical modulator and a method for manufacturing the same. The modulator includes first and second lower clad layers, a core layer, an upper clad layer, a waveguide, and electrodes. The waveguide may include an input waveguide, a waveguide divider, branch waveguides, and a waveguide combiner. Each of the branch waveguides includes first and second connection regions connected to the waveguide combiner and the waveguide divider, respectively, and a phase shift region having a cross-section of a reverse mesa structure that has an upper width that is the same as widths of the first and (Continued)

second connection regions and a lower width that is smaller than the widths of the first and second connection regions.

15 Claims, 11 Drawing Sheets

(56) References Cited

U.S. PATENT DOCUMENTS

| | | | |
|---|---|---|---|
| 7,355,778 | B2 | 4/2008 | Tsuzuki |
| 8,780,949 | B2 * | 7/2014 | Takagi ..................... H01S 5/12 |
| | | | 372/50.1 |
| 10,254,624 | B2 | 4/2019 | Ogiso |
| 2009/0034904 | A1 | 2/2009 | Tsuzuki et al. |
| 2012/0063714 | A1 | 3/2012 | Park |
| 2015/0293427 | A1 | 10/2015 | Goi et al. |
| 2015/0370095 | A1 | 12/2015 | Kondou et al. |
| 2018/0164654 | A1 | 6/2018 | Ogiso et al. |
| 2023/0073881 | A1 * | 3/2023 | Kim ........................ G02F 1/212 |
| 2024/0053652 | A1 * | 2/2024 | Kim ........................ G02F 1/212 |

FOREIGN PATENT DOCUMENTS

| | | | |
|---|---|---|---|
| JP | 2016-114712 | A | 6/2016 |
| JP | 2018-022172 | A | 2/2018 |
| JP | 6458143 | B2 | 1/2019 |

OTHER PUBLICATIONS

Yoshihiro Ogiso et al., "Over 67 GHz Bandwidth and 1.5 V $V\pi$ InP-Based Optical IQ Modulator With n-i-p-n Heterostructure", Journal of Lightwave Technology, 2017.

* cited by examiner

MACH-ZEHNDER INTERFEROMETRIC OPTICAL MODULATOR WITH SHALLOW RIDGE WAVEGUIDE STRUCTURE AND METHOD FOR MANUFACTURING THE SAME

CROSS-REFERENCE TO RELATED APPLICATIONS

This U.S. non-provisional patent application claims priority under 35 U.S.C. § 119 of Korean Patent Application No. 10-2021-0119437 filed on Sep. 8, 2021, the entire contents of which are hereby incorporated by reference.

BACKGROUND

The present disclosure herein relates to an optical modulator and a method for manufacturing the same, and more particularly, to a Mach-Zehnder interferometric optical modulator with a shallow ridge waveguide structure and a method for manufacturing the same.

Recently, with the advent of high-speed Internet and various multimedia services, the volume of global information is expected to increase exponentially. However, profits of network operators are expected to be stagnant, and there is an urgent need to secure optical component technology for achieving high speed, flexibility, small size, and low price of a system in addition to efficiency of network resources. Furthermore, it is required to develop an optical modulator having an ultrahigh transmission speed that may overcome physical and economic limitations of Internet traffic.

SUMMARY

The present disclosure provides a Mach-Zehnder interferometric optical modulator capable of reducing contact resistance between an electrode and a branch waveguide.

The present disclosure also provides a method for manufacturing Mach-Zehnder interferometric optical modulator, which may increase a production yield rate by improving an etching process margin.

An embodiment of the inventive concept provides a Mach-Zehnder interferometric optical modulator including: a substrate; first and second lower clad layers stacked on the substrate; a core layer on the first and second lower clad layers; an upper clad layer on the core layer; a waveguide on the upper clad layer; and electrodes on the waveguide. In an embodiment, the waveguide may include: an input waveguide that receives light; an output waveguide that is spaced apart from the input waveguide and outputs the light; a waveguide divider between the output waveguide and the input waveguide; a waveguide combiner between the waveguide divider and the output waveguide; and branch waveguides between the waveguide combiner and the waveguide divider. In an embodiment, each of the branch waveguides may include: first and second connection regions connected to the waveguide combiner and the waveguide divider, respectively; and a phase shift region provided between the first and second connection regions and having a cross-section of a reverse mesa structure that has an upper width that is the same as widths of the first and second connection regions and a lower width that is smaller than the widths of the first and second connection regions.

In an embodiment, the second connection region may have a length of 20 µm or less.

In an embodiment, the waveguide divider may have a length greater than that of the second connection region.

In an embodiment, the length of the waveguide divider may be greater than 20 µm.

In an embodiment, the lower width of the phase shift region may be 2 µm to 3 µm.

In an embodiment, the widths of the first and second connection regions may be at least 4 µm.

In an embodiment, the waveguide divider and the waveguide combiner may have a width of at least 10 µm.

In an embodiment, the input waveguide and the output waveguide may have the same width as the lower width of the phase shift region.

In an embodiment, the Mach-Zehnder interferometric optical modulator may further include an etching stop layer between the upper clad layer and the waveguide. In an embodiment, the etching stop layer may include InGaAsP, InAlAs, or InGaAlAs.

In an embodiment, the Mach-Zehnder interferometric optical modulator may further include a passivation layer provided on the etching stop layer outside the waveguide.

In an embodiment of the inventive concept, a method for manufacturing a Mach-Zehnder interferometric optical modulator includes: forming first and second lower clad layers on a substrate; forming a core layer on the first and second lower clad layers; forming an upper clad layer on the core layer; forming a waveguide layer on the upper clad layer; forming a waveguide on the upper clad layer; and forming electrodes on the waveguide. In an embodiment, the forming of the waveguide may include: forming a vertical mesa waveguide including an input waveguide of the waveguide, an output waveguide spaced apart from the input waveguide, and branch waveguides between the input waveguide and the output waveguide by patterning the waveguide layer using, as an etching mask, a first photoresist pattern exposing a portion of the waveguide layer; and forming phase shift regions with a cross-section of a reverse mesa structure having a lower width narrower than an upper width by partially patterning the branch waveguides using, as an etching mask, a second photoresist pattern exposing a portion of the branch waveguides.

In an embodiment, each of the branch waveguides may include: a first connection region between the input waveguide and the phase shift regions; and a second connection region between the output waveguide and the phase shift regions. In an embodiment, the first connection region and the second connection region may have the same width as the upper width of the phase shift region.

In an embodiment, the waveguide may further include: a waveguide divider between the first connection region and the input waveguide; and a waveguide combiner between the second connection region and the output waveguide.

In an embodiment, the waveguide combiner may have a first length greater than 20 µm, and the second connection region may have a second length of 20 µm or less.

In an embodiment, the upper width may be at least 4 µm, and the lower width may be 2 µm to 3 µm.

BRIEF DESCRIPTION OF THE FIGURES

The accompanying drawings are included to provide a further understanding of the inventive concept, and are incorporated in and constitute a part of this specification. The drawings illustrate embodiments of the inventive concept and, together with the description, serve to explain principles of the inventive concept. In the drawings.

DETAILED DESCRIPTION

Embodiments of the inventive concept will now be described in detail with reference to the accompanying drawings. The advantages and features of embodiments of the inventive concept, and methods for achieving the advantages and features will be apparent from the embodiments described in detail below with reference to the accompanying drawings. However, the inventive concept may be embodied in different forms and should not be construed as limited to the embodiments set forth herein. Rather, these embodiments are provided so that this disclosure will be thorough and complete, and will fully convey the scope of the inventive concept to those skilled in the art, and the inventive concept is only defined by the scope of the claims. Like reference numerals refer to like elements throughout. The terminology used herein is not for delimiting the embodiments of the inventive concept but for describing the embodiments of the inventive concept. The terms of a singular form may include plural forms unless otherwise specified. It will be further understood that the terms "include", "including", "comprise", and/or "comprising" used herein specify the presence of stated elements, steps, operations, and/or devices, but do not preclude the presence or addition of one or more other elements, steps, operations, and/or devices. Furthermore, the terms "clad", "core", "waveguide", and "phase shift region" may be construed as meaning those commonly used in the field of optical communications. Reference numerals, which are presented in the order of description, are provided according to the embodiments and are thus not necessarily limited to the order.

Figure 1:
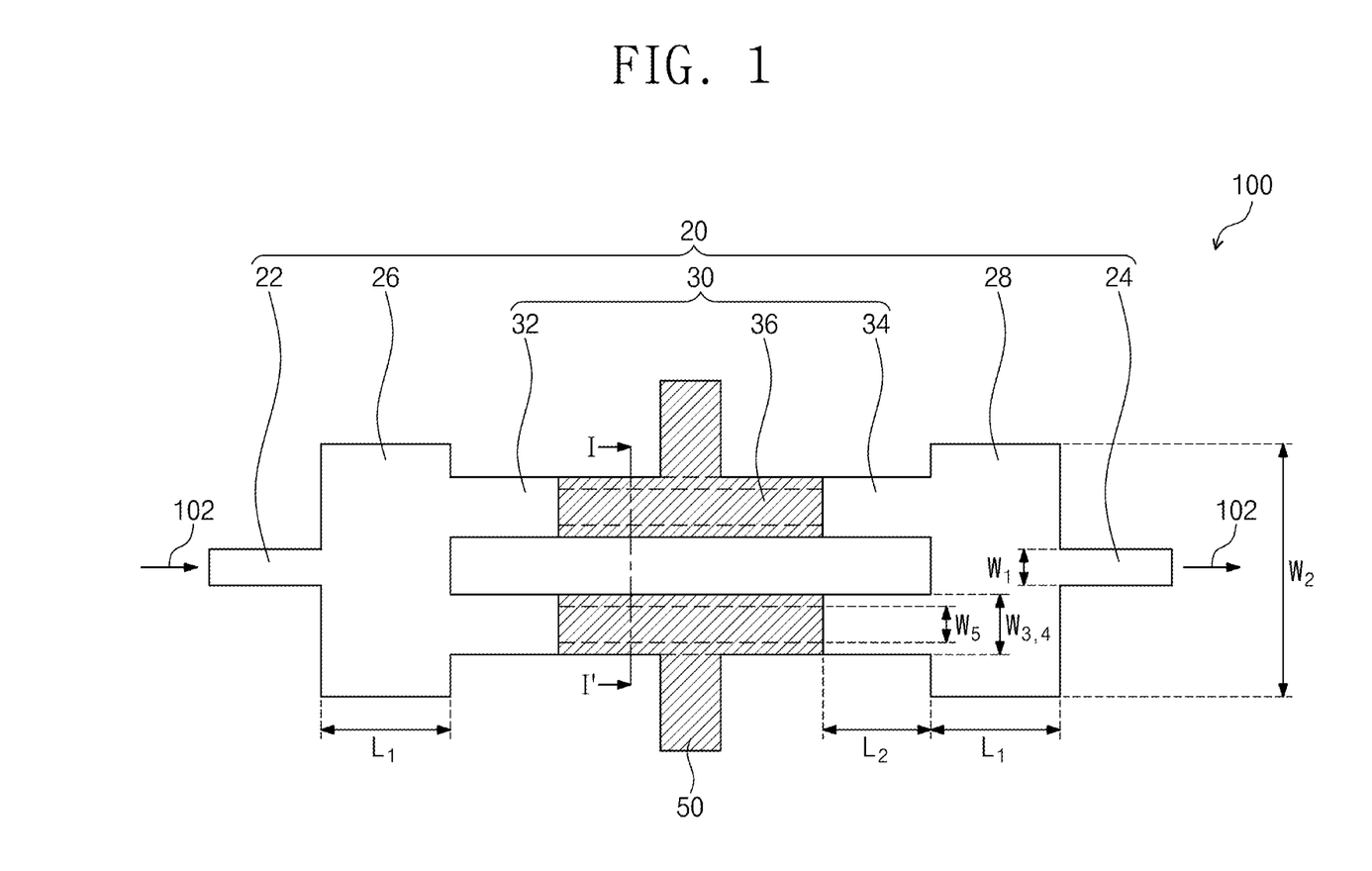
FIG. 1 illustrates an example of a Mach-Zehnder interferometric optical modulator according to an embodiment of the inventive concept.
Figure 2:
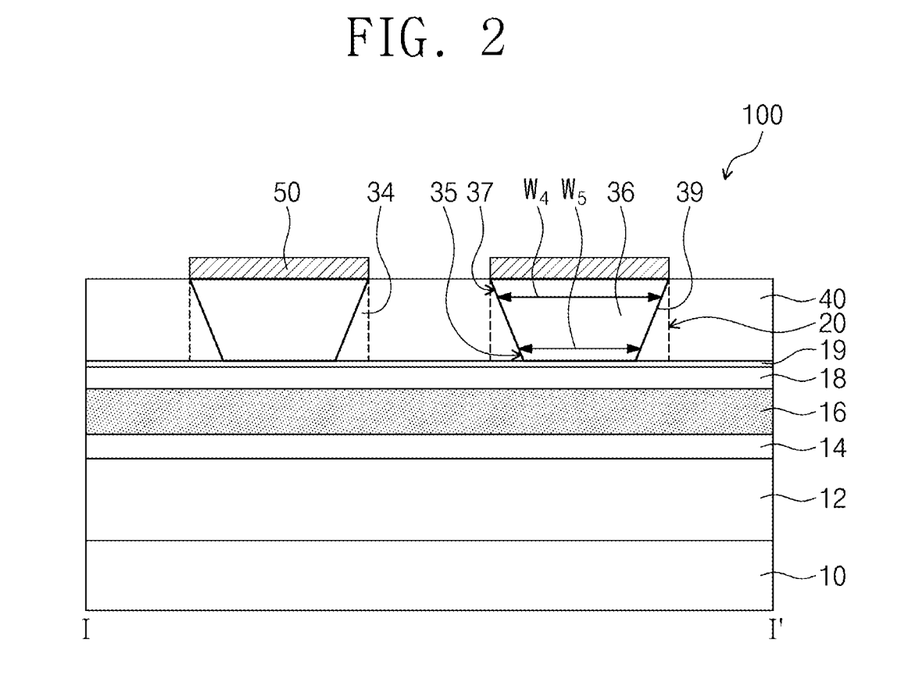
FIG. 2 is a cross-sectional view taken along line I-I' of FIG. 1.

FIG. 1 illustrates an example of a Mach-Zehnder interferometric optical modulator 100 according to an embodiment of the inventive concept. FIG. 2 is a cross-sectional view taken along line I-I' of FIG. 1.

Referring to FIGS. 1 and 2, the Mach-Zehnder interferometric optical modulator 100 of an embodiment of the inventive concept may be a Mach-Zehnder interference modulator with a reverse mesa-type shallow ridge waveguide structure. Alternatively, the Mach-Zehnder interferometric optical modulator 100 may be a Mach-Zehnder interferometric optical modulator with a mesa structure, but an embodiment of the inventive concept is not limited thereto. According to an embodiment, the Mach-Zehnder interferometric optical modulator 100 of an embodiment of the inventive concept may include a substrate 10, a first lower clad layer 12, a second lower clad layer 14, a core layer 16, an upper clad layer 18, an etching stop layer 19, a waveguide 20, a passivation layer 40, and electrodes 50.

The substrate 10 may be planar. For example, the substrate 10 may include a silicon wafer. Alternatively, the substrate 10 may include a glass substrate or a group III-V semiconductor substrate, but an embodiment of the inventive concept is not limited thereto.

The first lower clad layer 12 may be provided on the substrate 10. The first lower clad layer 12 may include n-type doped InP.

The second lower clad layer 14 may be provided on the first lower clad layer 12. The second lower clad layer 14 may include undoped InP.

The core layer 16 may be provided on the second lower clad layer 14. The core layer 16 may have a refractive index higher than refractive indices of the first lower clad layer 12 and the second lower clad layer 14. The core layer 16 may include InGaAsP or InGaAlAs, but an embodiment of the inventive concept is not limited thereto.

The upper clad layer 18 may be provided on the core layer 16. The upper clad layer 18 may have a refractive index lower than the refractive index of the core layer 16. The upper clad layer 18 may include undoped InP.

The etching stop layer 19 may be provided on the upper clad layer 18. The etching stop layer 19 may include InGaAsP, InAlAs, or InGaAlAs, but an embodiment of the inventive concept is not limited thereto.

The waveguide 20 may be provided on the etching stop layer 19. The waveguide 20 may include p-type doped InP. The waveguide 20 may extend in one direction. The waveguide 20 may be a ridge waveguide layer that transfers light 102 along the core layer 16. The waveguide 20 of a ridge waveguide layer may minimize and/or reduce current leakage that occurs in a sidewall of a typical mesa waveguide. According to an embodiment, the waveguide 20 may include an input waveguide 22, an output waveguide 24, a waveguide divider 26, a waveguide combiner 28, and branch waveguides 30.

The input waveguide 22 may be connected to one side of the waveguide divider 26. The input waveguide 22 may receive the light 102. For example, the input waveguide 22 may have a first width $W_1$ of about 2 μm to about 3 μm.

The output waveguide 24 may be connected to one side of the waveguide combiner 28. The output waveguide 24 may transfer the light 102 to the outside. The output waveguide 24 may have the same width as that of the input waveguide 22. For example, the output waveguide 24 may have the first width $W_1$ of about 2 μm to about 3 μm.

The waveguide divider 26 may be connected between the input waveguide 22 and the branch waveguides 30. The input waveguide 22 may be connected to the one side of the waveguide divider 26, and the branch waveguides 30 may be connected to another side of the waveguide divider 26. The waveguide divider 26 may receive the light 102 in the input waveguide 22 and distribute the light 102 to the branch waveguides 30. For example, the waveguide divider 26 may have a first length $L_1$ greater than about 20 μm and a second width $W_2$ of at least about 10 μm.

The waveguide combiner 28 may be connected between the branch waveguides 30 and the output waveguide 24. The branch waveguides 30 may be connected to another side of the waveguide combiner 28, and the output waveguide 24 may be connected to the one side of the waveguide combiner 28. The waveguide combiner 28 may receive the light 102 in the branch waveguides 30. The light 102 in the waveguide combiner 28 may be interfered with. The waveguide combiner 28 may have the same area as that of the waveguide divider 26. For example, the waveguide combiner 28 may have the first length $L_1$ greater than about 20 μm and the second width $W_2$ of at least about 10 μm.

The branch waveguides 30 may be connected between the waveguide divider 26 and the waveguide combiner 28. The branch waveguides 30 may be parallel with each other. The branch waveguides 30 may receive the light 102 from the waveguide divider 26 and provide the light 102 to the waveguide combiner 28. The branch waveguides 30 may shift a phase of the light 102 so as to interfere with the light 102 in the waveguide combiner 28. The branch waveguides 30 may shift the phase of the light 102 by changing a refractive index of the light 102 using an electric field (not shown) between the electrodes 50 and the substrate 10. According to an embodiment, the branch waveguides 30 each may include a first connection region 32, a second connection region 34, and a phase shift region 36.

The first connection region 32 may be provided between the waveguide divider 26 and the phase shift region 36. The first connection region 32 may be a region connecting the phase shift region 36 to the waveguide divider 26. The first connection region 32 may have a width greater than the widths of the input waveguide 22 and the output waveguide 24. For example, the first connection region 32 may have a third width $W_3$ of at least about 4 μm.

The second connection region 34 may be provided between the phase shift region 36 and the waveguide combiner 28. The second connection region 34 may be a bonding region connecting the phase shift region 36 to the waveguide combiner 28. The second connection region 34 may be a region transferring the light 102 in the phase shift region 36 to the waveguide combiner 28. The second connection region 34 may have the same width as that of the first connection region 32. The second connection region 34 may have the third width $W_3$ of at least about 4 μm. The second connection region 34 may have a cross-section of a vertical mesa structure. Likewise, the first connection region 32 may have a cross-section of a vertical mesa structure.

The phase shift region 36 may be provided between the first connection region 32 and the second connection region 34. The phase shift region 36 may shift the phase of the light 102 by changing a refractive index of the light 102 using an electric field (not shown) between the electrodes 50 and the substrate 10. According to an embodiment, the phase shift region 36 may have a cross-section of a reverse mesa structure 39. The cross-section of the reverse mesa structure 39 may have a trapezoidal shape. The cross-section of the reverse mesa structure 39 may include an upper portion 37 and a lower portion 35.

The upper portion 37 may be wider or larger than the lower portion 35. The upper portion 37 may be a top portion and/or a head portion. The upper portion 37 may have the same width as the widths of the first connection region 32 and the second connection region 34. An upper surface of the upper portion 37 may have an upper width $W_4$ of at least about 4 μm.

The lower portion 35 may be narrower or smaller than the upper portion 37. The lower portion 35 may be a neck portion and/or a bottom portion of the cross-section of the reverse mesa structure 39, but an embodiment of the inventive concept is not limited thereto. The lower portion 35 may have the same width as the widths of the input waveguide 22 and the output waveguide 24. For example, the lower portion 35 may have a lower width $W_5$ of about 2 μm to about 3 μm.

The passivation layer 40 may be provided on the etching stop layer 19 outside the waveguide 20. The passivation layer 40 may be coplanar with the waveguide 20. The passivation layer 40 may include a dielectric of silicon oxide or silicon nitride. Alternatively, the passivation layer 40 may include a polymer, but an embodiment of the inventive concept is not limited thereto.

The electrodes 50 may be provided on the phase shift regions 36 and the passivation layer 40. The electrodes 50 may shift the phase of the light 102 by changing a refractive index of the phase shift regions 36 using an electric field. When a phase difference of the light 102 in the phase shift regions 36 is π, the light 102 may be extinct due to destructive interference. When the phase difference of the light 102 in the phase shift regions 36 is 0 or 2π, the light 102 may be amplified due to constructive interference or may be output without interference through the output waveguide 24. Therefore, the Mach-Zehnder interferometric optical modulator 100 of an embodiment of the inventive concept may modulate the light 102 using interference of the light 102.

Figure 3:
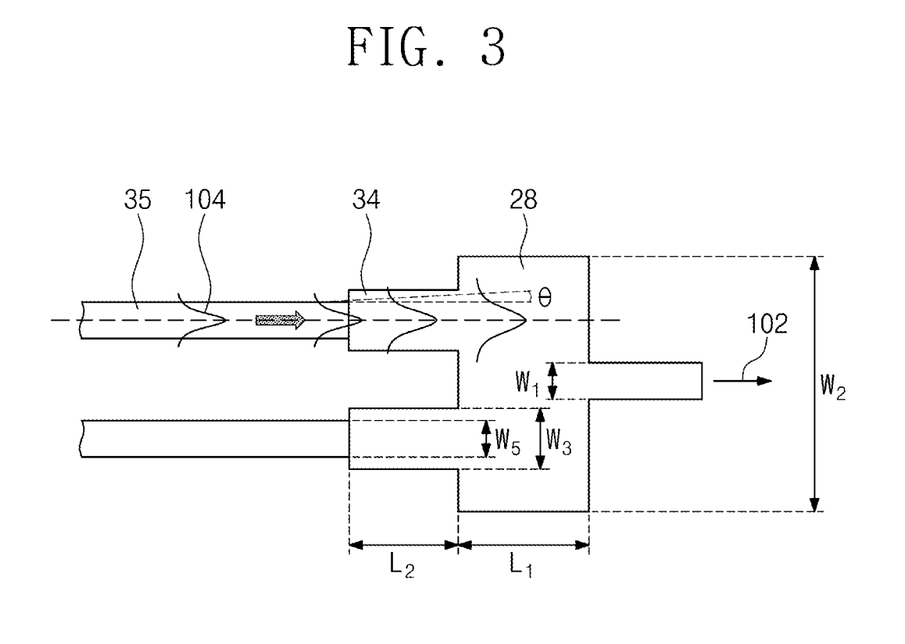
FIG. 3 is a plan view illustrating an example of the lower portion of the phase shift region, the second connection region, and the waveguide combiner of FIG. 2.

FIG. 3 illustrates an example of the lower portion 35 of the phase shift region 36, the second connection region 34, and the waveguide combiner 28 of FIG. 2.

Referring to FIG. 3, a light mode 104 of the light 102 in the phase shift region 36 may be dispersed in the second connection region 34 and the waveguide combiner 28. A dispersion angle θ (=2λ/πnw) of the light mode 104 may be proportional to a wavelength λ of the light 102 and may be inversely proportional to a refractive index n and light intensity w of the light 102. Here, π may be in radians.

Figure 4:
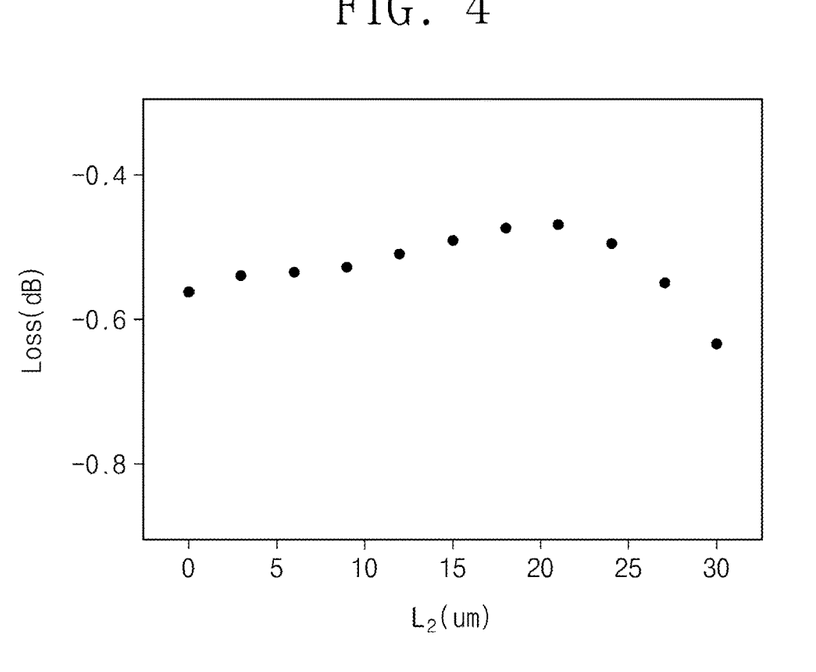
FIG. 4 is a graph illustrating loss of light according to the second length of the second connection region of FIG. 2.

FIG. 4 illustrates loss of the light 102 according to a second length $L_2$ of the second connection region 34 of FIG. 2.

Referring to FIG. 4, when the second length $L_2$ of the second connection region 34 is about 20 μm or less, the Mach-Zehnder interferometric optical modulator 100 may reduce optical loss to about −0.55 dB or more. When the second length $L_2$ of the second connection region 34 is greater than about 24 μm, the optical loss may be reduced to about −0.6 dB or less. Therefore, the Mach-Zehnder interferometric optical modulator 100 of an embodiment of the inventive concept may minimize and/or prevent the optical loss using the second connection region 34 having the second length $L_2$ of about 20 μm or less.

Referring back to FIG. 3, the first length $L_1$ of the waveguide combiner 28 may be greater than the second length $L_2$ of the second connection region 34. When the second length $L_2$ is about 20 the first length $L_1$ may be greater than about 20 The waveguide combiner 28 may induce interference and internal reflection of the light mode 104. The waveguide combiner 28 may provide the light mode 104 to the output waveguide 24 by making the light mode 104 of the plurality of phase shift regions 36 interfere with or internally reflect. When the second length $L_2$ is greater than about 20 interference efficiency and internal reflection efficiency of the light mode 104 may increase.

Figure 5:
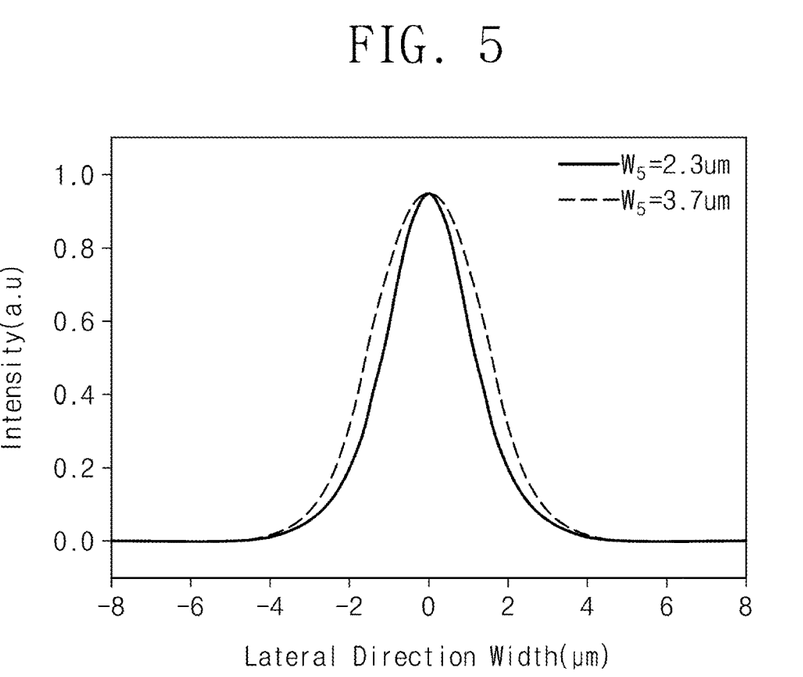
FIG. 5 is a graph illustrating normalized intensity of a light mode according to the lower width of FIG. 3.

FIG. 5 illustrates normalized intensity of the light mode 104 according to the lower width $W_5$ of FIG. 3.

Referring to FIG. 5, when the lower width $W_5$ of the phase shift region 36 decreases, a lateral width of the light mode 104 may decrease and the intensity of the light mode 104 may increase. Namely, a beam size of the light 102 may reduce and the intensity of the light 102 may increase. Within a lateral width of about 2 μm, the lower width $W_5$ of about 2.4 μm may transfer the light mode 104 of a lateral width that is smaller than the lower width $W_5$ of about 3.6

μm. The lateral width may be a width in an outward direction from a center of the phase shift region 36. When the lower width $W_5$ is about 2 μm to about 3 μm, the intensity of the light mode 104 may maximally increase.

On the contrary, the upper width $W_4$ of the phase shift region 36 may be greater than the lower width $W_5$. According to an embodiment, for example, the upper width $W_4$ of the phase shift region 36 may be at least about 4 μm. The upper width $W_4$ of the phase shift region 36 may be at least two times greater than the lower width $W_5$. The reverse mesa structure 39 of the phase shift region 36 may increase the upper width $W_4$ of the phase shift region 36, thus reducing contact resistance. When the upper width $W_4$ of the phase shift region 36 decreases, contact resistance between the electrode 50 and the phase shift region 36 may increase. When the upper width $W_4$ of the phase shift region 36 increases, the contact resistance between the electrode 50 and the phase shift region 36 may reduce.

Therefore, the Mach-Zehnder interferometric optical modulator 100 of an embodiment of the inventive concept may reduce the contact resistance between the electrodes 50 and the branch waveguides 30 using the phase shift region 36 with a cross-section of the reverse mesa structure 39.

A method for manufacturing the Mach-Zehnder interferometric optical modulator 100 configured as described above is described below.

Figure 6:
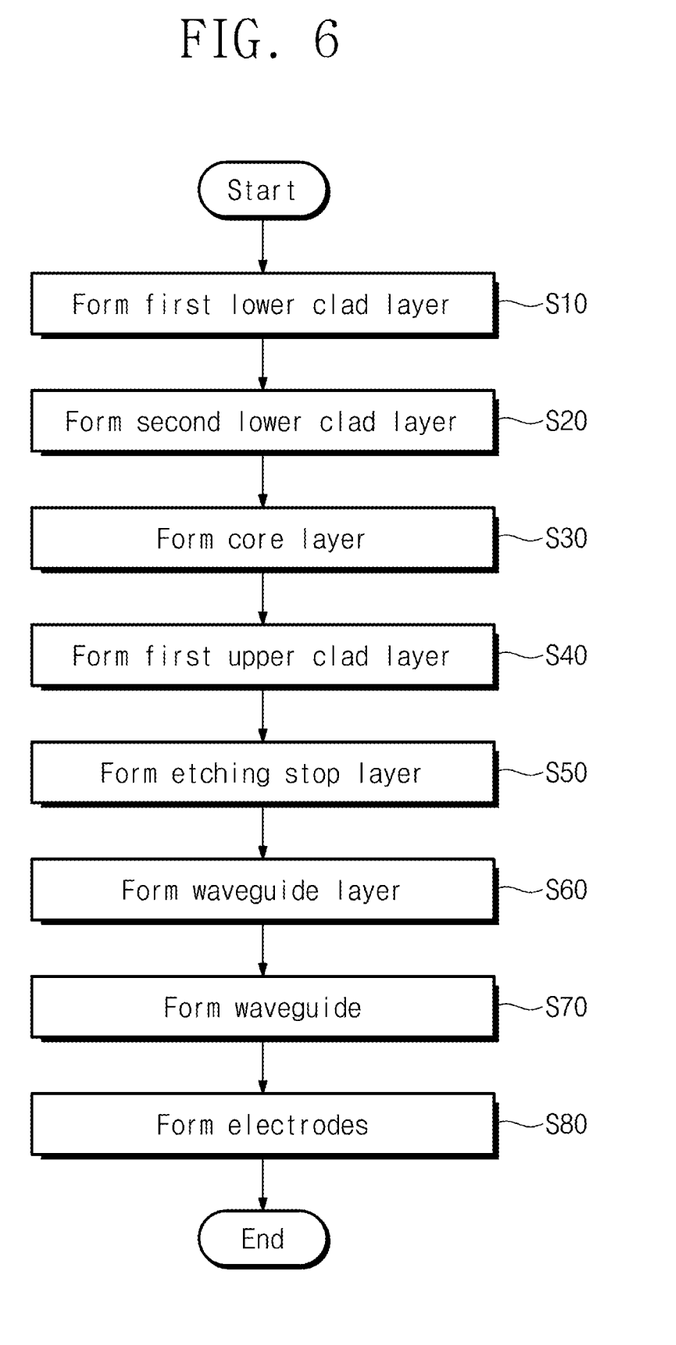
FIG. 6 is a flowchart illustrating a method for manufacturing a Mach-Zehnder interferometric optical modulator of an embodiment of the inventive concept.

FIG. 6 illustrates a method for manufacturing the Mach-Zehnder interferometric optical modulator 100 of an embodiment of the inventive concept. FIGS. 7 to 16 are cross-sectional views illustrating a manufacturing process of the Mach-Zehnder interferometric optical modulator 100 of FIG. 2.

Figure 7:
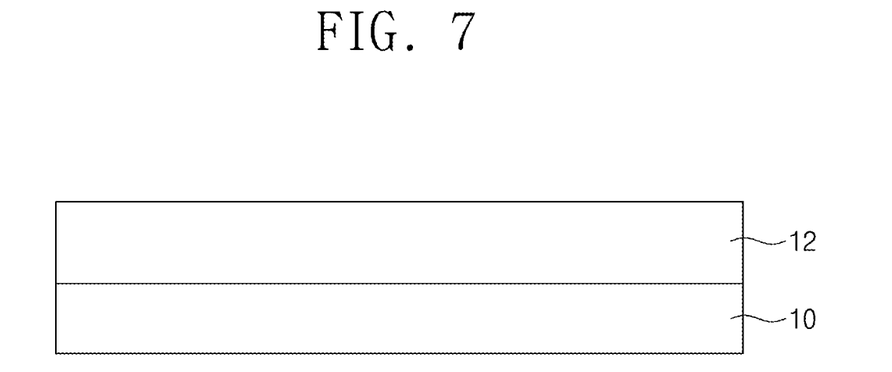
FIGS. 7 to 16 are cross-sectional views illustrating a manufacturing process of the Mach-Zehnder interferometric optical modulator of FIG. 2.

Referring to FIGS. 6 and 7, the first lower clad layer 12 is formed on the substrate 10 (S10). The first lower clad layer 12 may include n-type doped InP formed using a molecular beam epitaxy (MBE) method or metal-organic vapor phase epitaxy (MOVPE) method.

Figure 8:
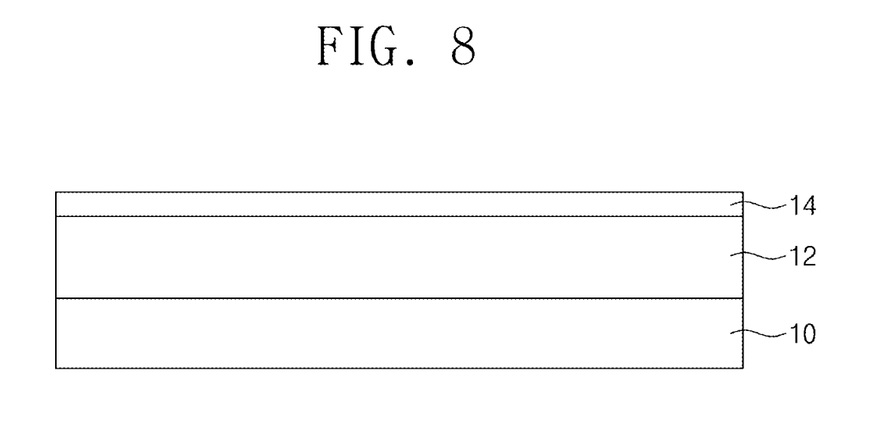

Referring to FIGS. 6 and 8, the second lower clad layer 14 is formed on the first lower clad layer 12 (S20). The second lower clad layer 14 may include undoped InP formed using a metal-organic vapor phase deposition method (MOVPE).

Figure 9:
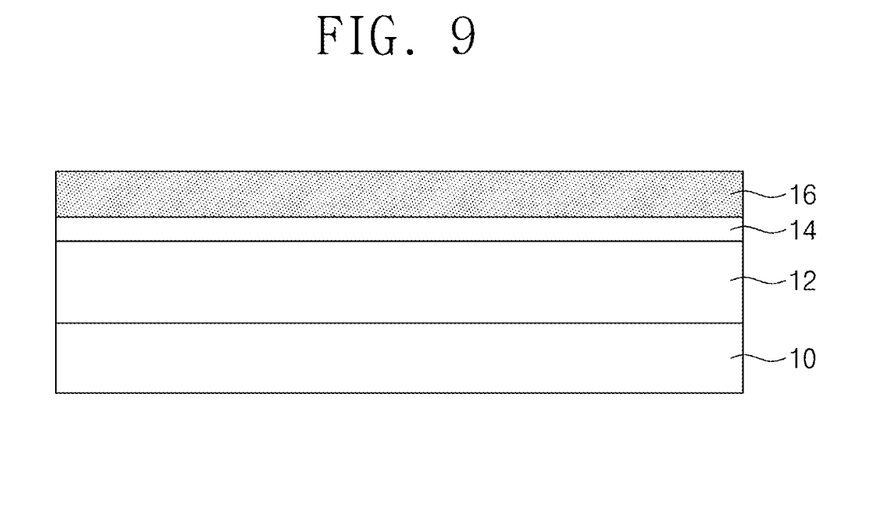

Referring to FIGS. 6 and 9, the core layer 16 is formed on the second lower clad layer 14 (S30). The core layer 16 may include InGaAsP or InGaAlAs formed using a metal-organic vapor phase deposition method (MOVPE).

Figure 10:
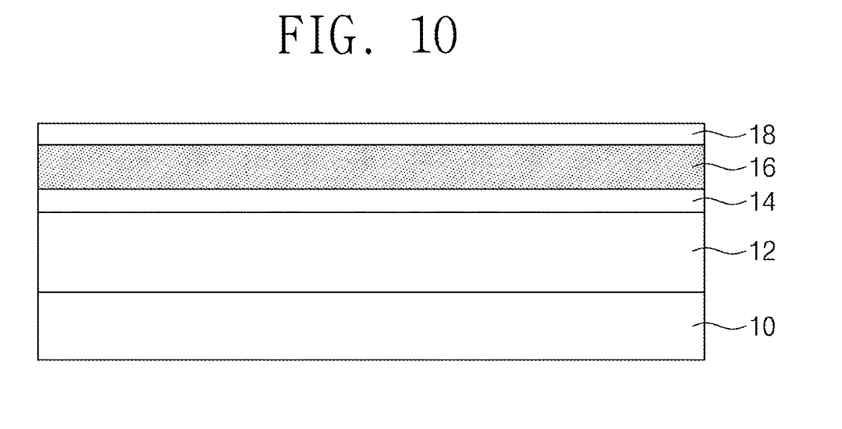

Referring to FIGS. 6 and 10, the upper clad layer 18 is formed on the core layer 16 (S40). The upper clad layer 18 may include undoped InP formed using a metal-organic vapor phase deposition method (MOVPE).

Figure 11:
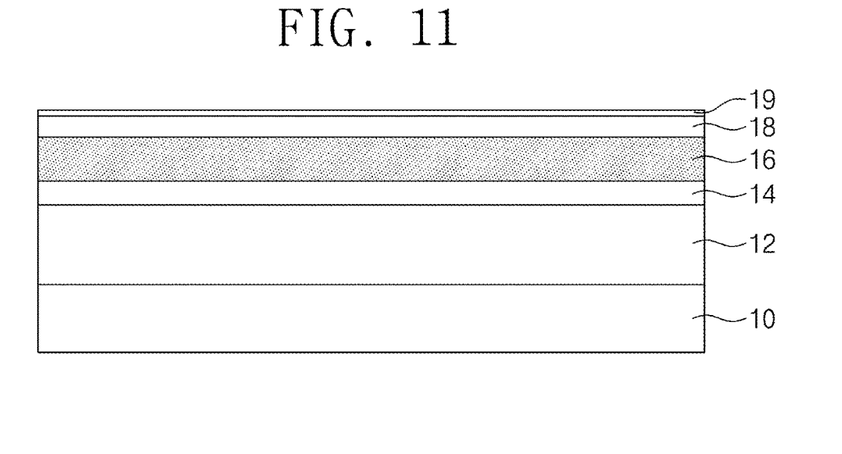

Referring to FIGS. 6 and 11, the etching stop layer 19 is formed on the upper clad layer 18 (S50). The etching stop layer 19 may include InGaAsP, InAlAs, or InGaAlAs formed using a metal-organic vapor phase deposition method (MOVPE).

Figure 12:
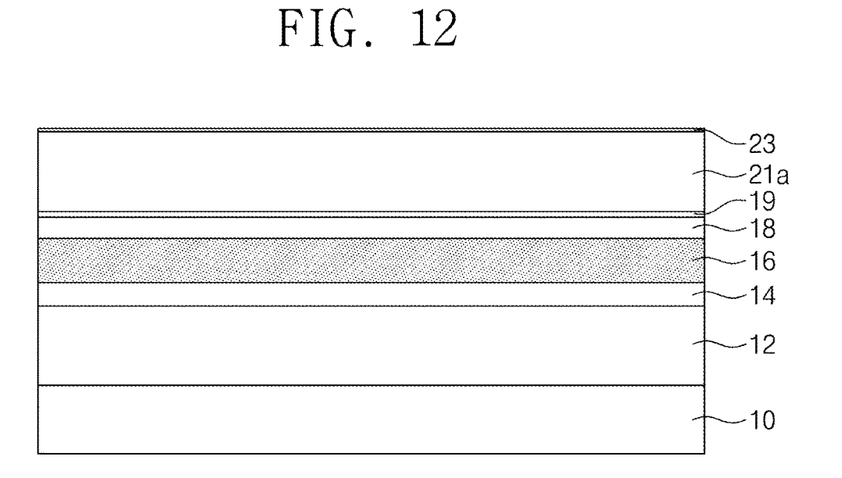

Referring to FIGS. 6 and 12, a waveguide layer 21a is formed on the etching stop layer 19 (S60). The waveguide layer 21a may include p-type doped InP formed using a metal-organic vapor phase deposition method (MOVPE). The first lower clad layer 12, the second lower clad layer 14, the core layer 16, the upper clad layer 18, the etching stop layer 19, and the waveguide layer 21a may be formed in situ in one chamber (not shown), but an embodiment of the inventive concept is not limited thereto. A hard mask layer 23 may be formed on the waveguide layer 21a. The hard mask layer 23 may include a dielectric of silicon nitride film or silicon oxide film.

Referring to FIGS. 6 and 13 to 16, the waveguide 20 is formed by patterning the waveguide layer 21a (S70).

Figure 17:
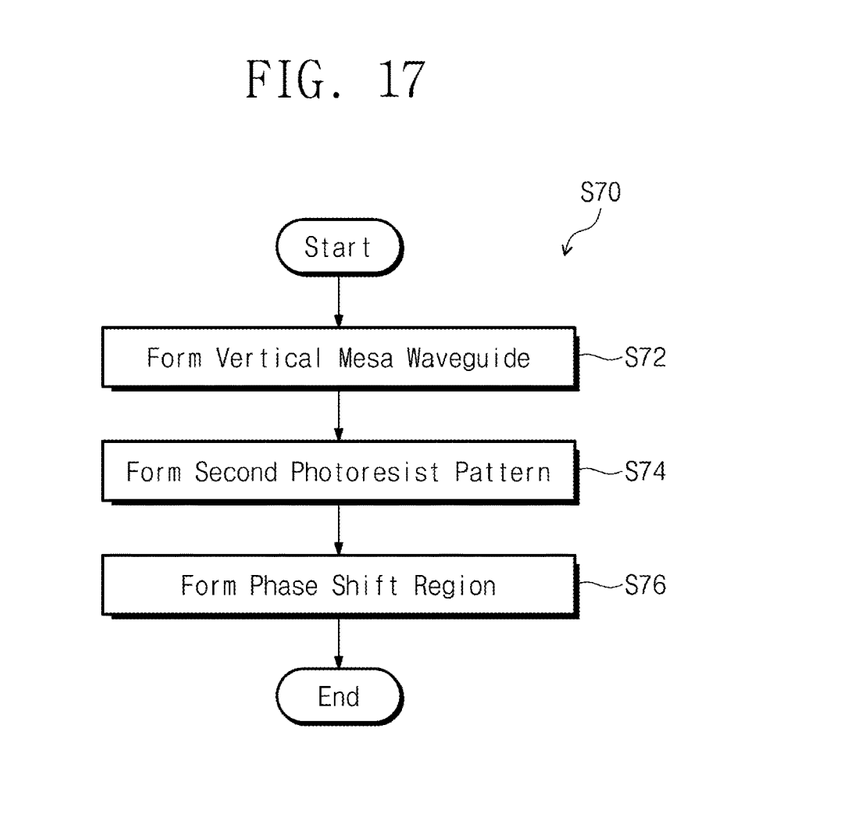
FIG. 17 is a flowchart illustrating an example of forming of the waveguide of FIG. 12.
Figure 18:
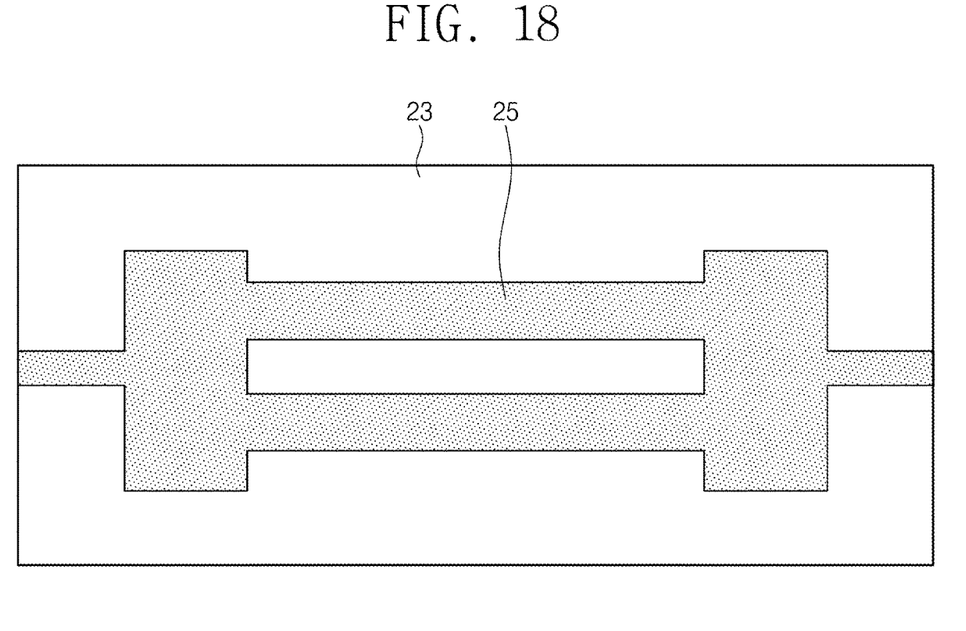
FIGS. 18 to 20 are plan views illustrating an example of a first photoresist pattern and second photoresist pattern provided on the etching stop layer of FIG. 12.
Figure 19:
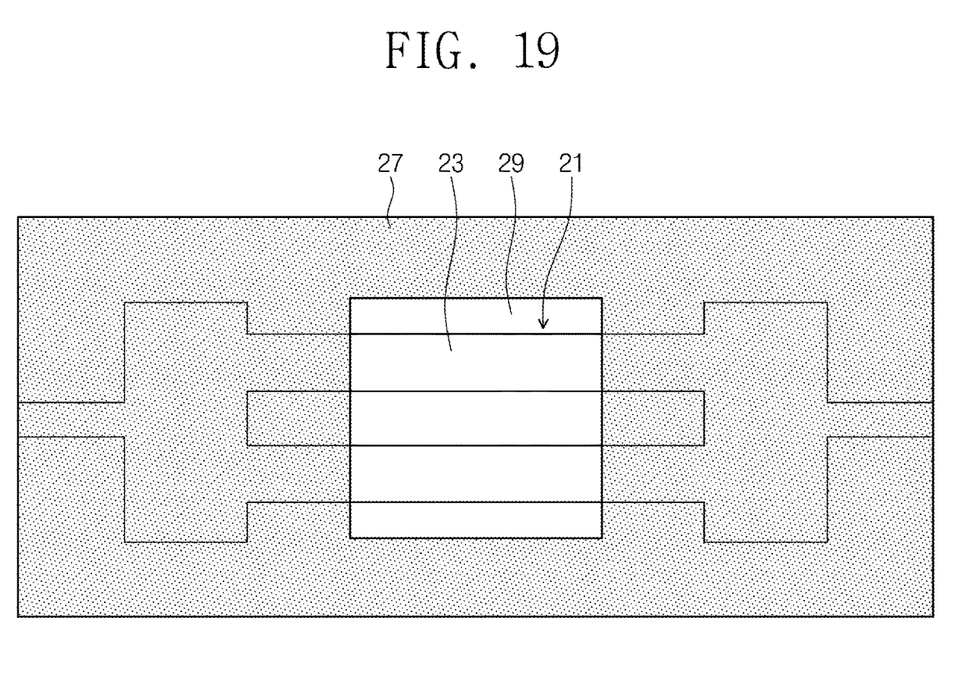
Figure 20:
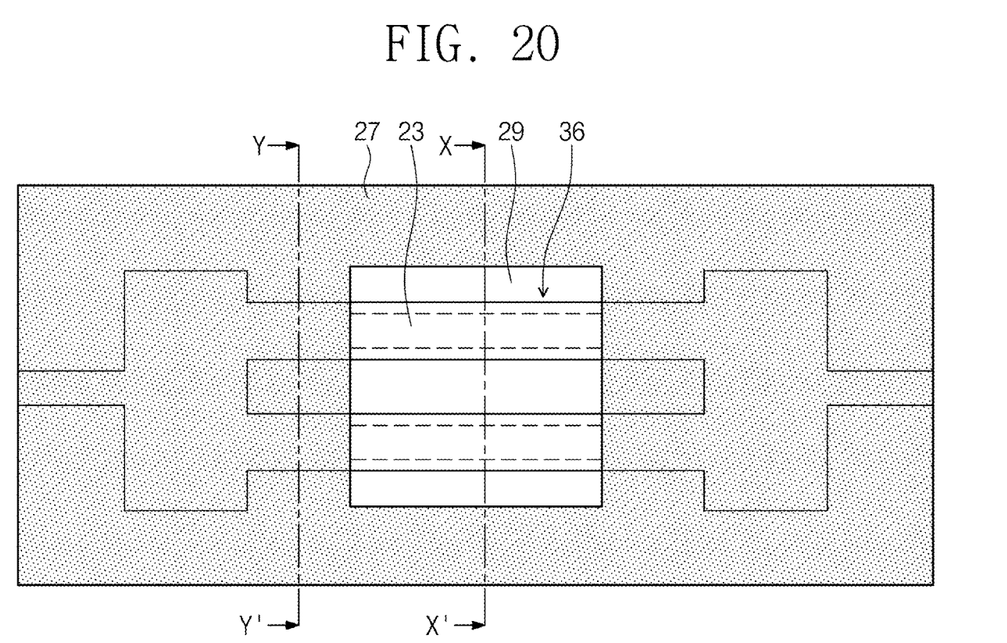

FIG. 17 illustrates an example of forming (S70) of the waveguide 20. FIGS. 18 to 20 illustrate an example of a first photoresist pattern 25 and second photoresist pattern 27 on the hard mask layer 23 of FIG. 12.

Referring to FIGS. 13, 14, 17, and 18, a vertical mesa waveguide 21 is patterned using the first photoresist pattern 25 as an etching mask (S72). The first photoresist pattern 25 may be formed on the waveguide layer 21a and the hard mask layer 23 through a photolithography process. The first photoresist pattern 25 may expose a portion of the hard mask layer 23. The waveguide layer 21a may be etched into the vertical mesa waveguide 21 using an anisotropic etching method. The anisotropic etching method may include a dry etching method. An upper surface and a lower surface of the vertical mesa waveguide 21 may have the same width. The vertical mesa waveguide 21 may be a shallow waveguide having a vertical structure, but an embodiment of the inventive concept is not limited thereto. Although not illustrated, the vertical mesa waveguide 21 may include the input waveguide 22, the output waveguide 24, the waveguide divider 26, the waveguide combiner 28, and the branch waveguides 30 of FIG. 1.

Figure 13:
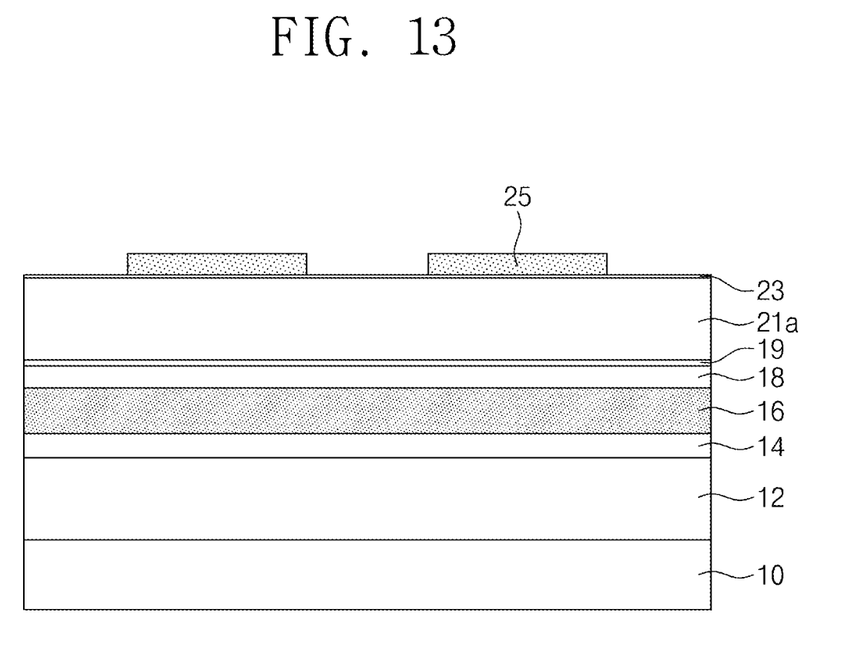
Figure 14:
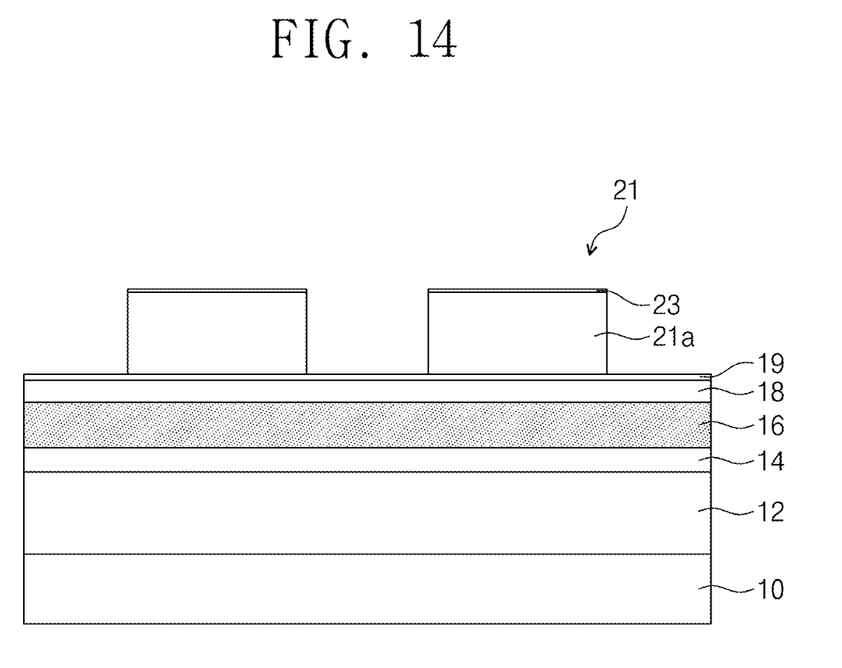
Figure 15A:
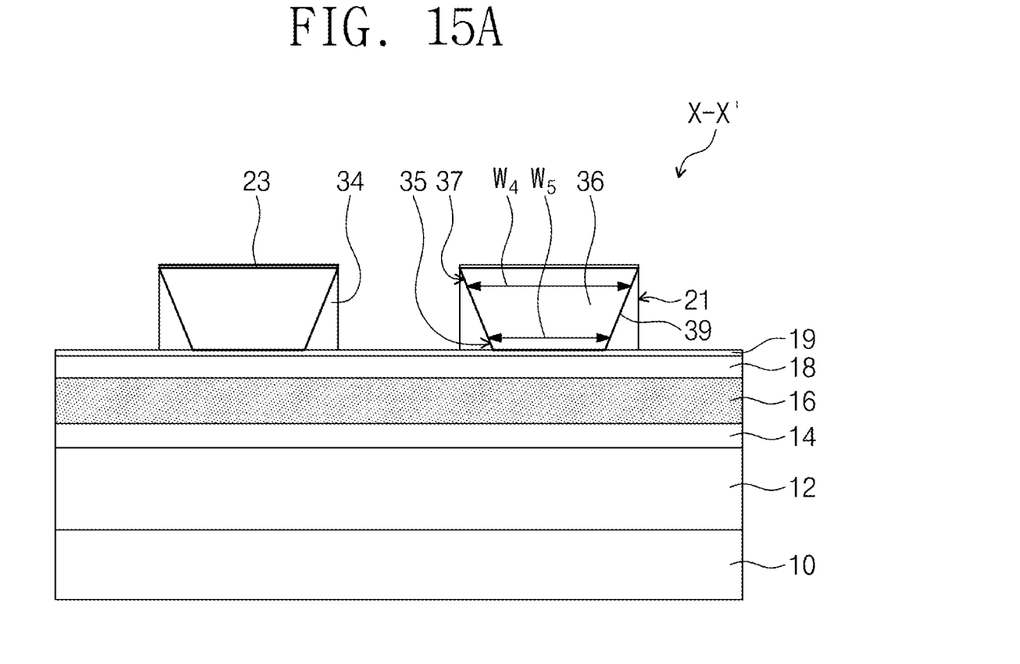
Figure 15B:
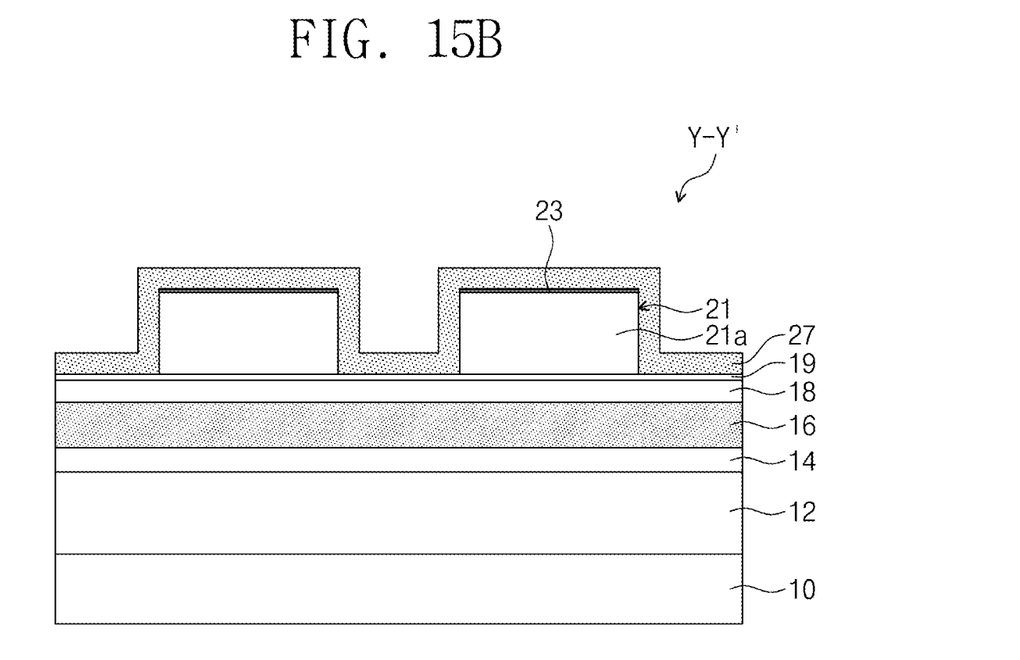

Thereafter, the first photoresist pattern 25 may be removed.

Referring to FIGS. 17 and 19, the second photoresist pattern 27 is formed (S74). The second photoresist pattern 27 may be formed on a portion of the vertical mesa waveguide 21 through a photolithography process. The second photoresist pattern 27 may have an opening 29 exposing a portion of the vertical mesa waveguide 21. The opening 29 may expose a portion of the branch waves 30 of FIG. 1. The opening 29 may have a quadrilateral shape.

Referring to FIGS. 1, 15A, 17, and 20, the phase shift region 36 is formed (S76). The phase shift regions 36 of the branch waveguides 30 may be formed to have the cross-section of the reverse mesa structure 39 using a wet etching method. The reverse mesa structure 39 of the phase shift region 36 may include the lower portion 35 and the upper portion 37 that is wider than the lower portion 35. The lower portion 35 may have the lower width $W_5$ of about 2 μm to about 3 μm, and the upper portion 37 may have the upper width $W_4$ of at least about 4 μm. The first connection region 32 and the second connection region 34 may be formed on two sides of each of the phase shift regions 36. The first connection region 32 and the second connection region 34 may have a cross-section of a vertical mesa structure. The cross-section of the reverse mesa structure 39 may be formed using a wet etching method. In the wet etching method, an etchant for the vertical mesa waveguide 21 may include a mixed solution of hydrochloric acid and phosphoric acid. The hard mask layer 23 may be used as an etching mask for the vertical mesa waveguide 21.

The hard mask layer 23 and the vertical mesa waveguide 21 straightly arranged in a plan view may be formed as the phase shift region 36 with the cross-section of the reverse mesa structure 39 using a wet etching method regardless of misalignment of the opening 29 of the second photoresist pattern 27. Namely, the vertical mesa waveguide 21 may be formed as the waveguide 20 including the phase shift region 36. The waveguide 20 may include the input waveguide 22, the output waveguide 24, the waveguide divider 26, the waveguide combiner 28, and the branch waveguides 30 of FIG. 1. A typical waveguide structure having a protruding shape in a plan view may cause a fault during an etching process due to misalignment of the opening 29 of the second photoresist pattern 27. The first connection region 32 and the second connection region 34 may be formed on two sides of each of the phase shift regions 36. The first connection region 32 and the second connection region 34 each may have the second length $L_2$ of about 20 μm or less and the third width $W_3$ of about at least 4 Each of the waveguide divider 26 and the waveguide combiner 28 outside the first connection region 32 and the second connection region 34 may have the first length $L_1$ greater than about 20 μm and the second width $W_2$ of at least about 10 μm.

Thereafter, the second photoresist pattern 27 and the hard mask layer 23 may be removed.

Therefore, the method for manufacturing the Mach-Zehnder interferometric optical modulator 100 of an embodiment of the inventive concept may increase a production yield rate by improving an etching process margin for the phase shift region 36 with the cross-section of the reverse mesa structure 29 by using the straight vertical mesa waveguide 21 exposed regardless of the opening 29 of the second photoresist pattern 27.

Figure 16:
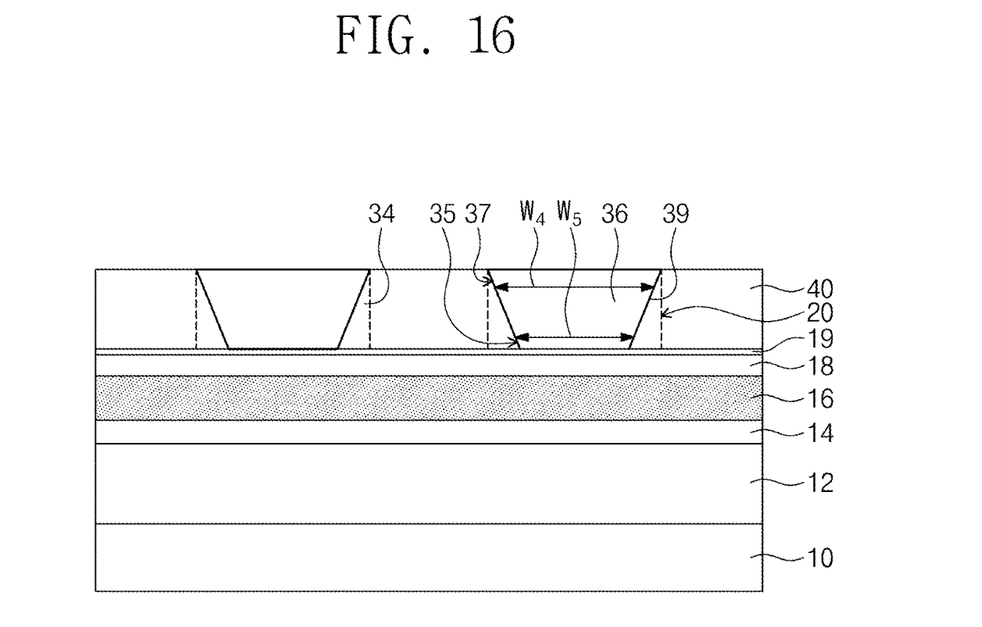

Referring to FIGS. 6 and 16, the passivation layer 40 is formed on the etching stop layer 19 outside the waveguide 20 (S70). The passivation layer 40 may include a dielectric of silicon oxide or silicon nitride formed using a chemical vapor deposition method. Alternatively, the passivation layer 40 may include a polymer formed using spin coating or a sol-gel method, but an embodiment of the inventive concept is not limited thereto.

Referring to FIGS. 2 and 3, the electrodes 50 are formed on the phase shift regions 36 and the passivation layer 40 (S80). The electrodes 50 may include metal formed through a deposition process, a photolithography process, and an etching process. For example, the electrodes 50 may include at least one of gold (Au), silver (Ag), copper (Cu), aluminum (Al), titanium (Ti), tungsten (W), or tantalum (Ta), but an embodiment of the inventive concept is not limited thereto.

As described above, the Mach-Zehnder interferometric optical modulator according to an embodiment of the inventive concept may reduce contact resistance between an electrode and a branch waveguide using a phase shift region with a cross-section of a reverse mesa structure. Furthermore, a method for manufacturing a Mach-Zehnder interferometric optical modulator of an embodiment of the inventive concept may increase the production yield rate by improving an etching process margin for a phase shift region with a cross-section of a reverse mesa structure by using a straight waveguide layer exposed regardless of an opening of a photoresist pattern.

Although the embodiments of the present invention have been described, it is understood that the present invention should not be limited to these embodiments but various changes and modifications can be made by one ordinary skilled in the art within the spirit and scope of the present invention as hereinafter claimed.

What is claimed is:

1. A Mach-Zehnder interferometric optical modulator comprising:
   first and second lower clad layers stacked on a substrate;
   a core layer on the first and second lower clad layers;
   an upper clad layer on the core layer;
   a waveguide on the upper clad layer; and
   electrodes on the waveguide,
   wherein the waveguide comprises:
   an input waveguide;
   an output waveguide spaced apart from the input waveguide;
   a waveguide divider between the output waveguide and the input waveguide;
   a waveguide combiner between the waveguide divider and the output waveguide; and
   branch waveguides between the waveguide combiner and the waveguide divider,
   wherein each of the branch waveguides comprises:
   first and second connection regions connected to the waveguide combiner and the waveguide divider, respectively; and
   a phase shift region provided between the first and second connection regions and having a cross-section of a reverse mesa structure that has an upper width that is the same as widths of the first and second connection regions and a lower width that is smaller than the widths of the first and second connection regions.

2. The Mach-Zehnder interferometric optical modulator of claim 1, wherein the second connection region has a length of 20 μm or less.

3. The Mach-Zehnder interferometric optical modulator of claim 2, wherein the waveguide divider has a length greater than that of the second connection region.

4. The Mach-Zehnder interferometric optical modulator of claim 3, wherein the length of the waveguide divider is greater than 20 μm.

5. The Mach-Zehnder interferometric optical modulator of claim 1, wherein the lower width of the phase shift region is 2 μm to 3 μm.

6. The Mach-Zehnder interferometric optical modulator of claim 1, wherein the widths of the first and second connection regions are at least 4 μm.

7. The Mach-Zehnder interferometric optical modulator of claim 1,
   wherein the waveguide divider and the waveguide combiner have a width of at least 10 μm.

8. The Mach-Zehnder interferometric optical modulator of claim 1, wherein the input waveguide and the output waveguide have the same width as the lower width of the phase shift region.

9. The Mach-Zehnder interferometric optical modulator of claim 1, further comprising an etching stop layer between the upper clad layer and the waveguide, wherein the etching stop layer comprises InGaAsP, InAlAs, or InGaAlAs.

10. The Mach-Zehnder interferometric optical modulator of claim 9, further comprising a passivation layer provided on the etching stop layer outside the waveguide.

11. A method for manufacturing a Mach-Zehnder interferometric optical modulator, comprising:
    forming first and second lower clad layers on a substrate;
    forming a core layer on the first and second lower clad layers;
    forming an upper clad layer on the core layer;
    forming a waveguide layer on the upper clad layer;
    forming a waveguide by patterning the waveguide layer; and
    forming electrodes on the waveguide,
    wherein the forming of the waveguide comprises:
    forming a vertical mesa waveguide including an input waveguide of the waveguide, an output waveguide spaced apart from the input waveguide, and branch waveguides between the input waveguide and the output waveguide by patterning the waveguide layer using, as an etching mask, a first photoresist pattern exposing a portion of the waveguide layer; and
    forming phase shift regions with a cross-section of a reverse mesa structure having a lower width narrower than an upper width by partially patterning the branch waveguides using, as an etching mask, a second photoresist pattern exposing a portion of the branch waveguides.

12. The method of claim 11, wherein each of the branch waveguides comprises:
   a first connection region between the input waveguide and the phase shift regions; and
   a second connection region between the output waveguide and the phase shift regions,
   wherein the first connection region and the second connection region have the same width as the upper width of the phase shift region.

13. The method of claim 12, wherein the waveguide further comprises:
   a waveguide divider between the first connection region and the input waveguide; and
   a waveguide combiner between the second connection region and the output waveguide.

14. The method of claim 13, wherein the waveguide combiner has a first length greater than 20 µm, and the second connection region has a second length of 20 µm or less.

15. The method claim 11, wherein the upper width is at least 4 µm, and the lower width is 2 µm to 3 µm.

* * * * *